United States Patent [19]

Siler

[11] Patent Number: 4,593,314

[45] Date of Patent: Jun. 3, 1986

[54] ECHOCARDIOGRAM MACHINE CONTROL

[75] Inventor: William M. Siler, Birmingham, Ala.

[73] Assignee: The Kemp-Carraway Heart Institute, Birmingham, Ala.

[21] Appl. No.: 611,103

[22] Filed: May 17, 1984

[51] Int. Cl.$^4$ .............................................. H04N 5/30
[52] U.S. Cl. ................................... 358/112; 364/414; 128/660; 128/661; 73/620
[58] Field of Search ................. 358/112, 169; 128/661, 128/660; 73/620; 364/414

[56] References Cited

U.S. PATENT DOCUMENTS

| Re. 30,397 | 9/1980 | King | 364/414 X |
|---|---|---|---|
| 4,127,034 | 11/1978 | Lederman et al. | 73/626 |
| 4,167,753 | 9/1979 | Lynk | 358/112 X |
| 4,212,072 | 7/1980 | Huelsman et al. | 358/112 X |
| 4,271,842 | 6/1981 | Specht et al. | 128/661 |
| 4,274,422 | 6/1981 | Anderson et al. | 128/661 |
| 4,359,904 | 11/1982 | Engle et al. | 358/112 X |
| 4,375,671 | 3/1983 | Engle | 358/112 X |
| 4,518,992 | 5/1985 | Kessler et al. | 358/112 |

Primary Examiner—Michael A. Masinick
Assistant Examiner—Victor R. Kostak
Attorney, Agent, or Firm—Dann, Dorfman, Herrell and Skillman

[57] ABSTRACT

A manually adjusted echocardiogram machine for a display device is converted to automatic by providing servo adjustment in place of manual adjustment for regional and global brightness controls. A computer is programmed to make rapid sequential comparison of relative brightness of pixels within defined areas of the display controlled by each of the respective controls. The output for each of the areas is compared with a predetermined standard in a computer program to produce a correction signal, for example, incrementally moving toward correction of a particular region's brightness. The computer program controls sequence and distributes correction signals.

10 Claims, 3 Drawing Figures

ECHOCARDIOGRAM MACHINE CONTROL

BACKGROUND OF THE INVENTION

The present invention relates to echocardiography and more specifically to the use of automatic controls for ultrasound echocardiogram machines displaying a two dimensional image. In particular, the present invention relates to a system for adjustment of such a machine using a digital computer to compute and set various modified controls of an otherwise conventional echocardiogram machine.

NATURE OF THE PRIOR ART

Echocardiography involves the use of ultrasound pulses to obtain sonar-like images of the heart. The technique is noninvasive, totally painless and non-traumatic for the patient.

Until the early 1970's, the most useful mode of presentation for the clinician was the so-called "M-mode" presentation. In this mode a single pencil beam of ultrasound is directed toward the patient's heart. The beam is held as fixed in space as is possible for the technician. Although the beam is 1-dimensional, the presentation is 2-dimensional. A first dimension is that directed transversely across a roll of sensitized paper. It represents the distance from the skin, or depth within the patient, at which the echo occurs. The other dimension directed along the roll of paper is time. This 1-dimensional mode while clearly useful is not that with which the present invention is concerned.

A second very useful mode is known as the "2-D" or "sector-scan echocardiogram". This technique has been used for only a relatively few years, on the order of eight years, from the filing date hereof. In this mode, the ultrasonic pencil beam is swept through an angle of roughly 60 degrees in a plane and reflections detected. The images which appear on a cathode ray tube (CRT) display are 2-dimensional. One dimension represents the depth within the patient. The other dimension represents lateral displacement from the nominal center line of the transducer and its sweep ultrasound beam. Here, time is taken into account by showing a sequence of images, normally taken 30 times a second. The image represents a cross-section of the heart itself. Multiple cardiogram images are usefully taken in each of several standard planes. A considerable amount of diverse clinical information can be obtained from these images. In electronic terms, the images are rather noisy, and therefore, approximate. Still, two major classes of information are obtainable, one involving valve function and the other involving myocardial muscle function. Information regarding the coronary artery tree cannot be obtained from the echocardiogram.

The cardiogram pictures are obtained on a specific type of echocardiogram machine having CRT displays. The image is a pie or wedge-shaped picture corresponding to a similarly shaped section scanned through the heart by the ultrasonic beam or pencil. Picture quality depends on skillful transducer placement by the technician and his equally skillful adjustment of controls to improve quality of the picture. Commonly the picture is divided into a plurality of adjacent wedge shaped sections, considered one by one, each with its respective gain control. An overall brightness control for the entire picture and a compress or contrast control are also commonly provided.

The physician is interested in obtaining an image of "clinical quality", a somewhat subjective standard. An image is of good clinical quality if the physician can make a confident diagnosis from it; of poor clinical quality if he cannot. Clinical quality is a mix of factors. It involves the skill of the technician in positioning the transducer; the skill of the technician in setting the echocardiogram machine controls; and the tractability of the individual patient for echocardiography. Tractability, in turn, involves such things as the presence of lung disease, interfering structure and so forth. The component of this mix which may be improved by the present invention relates to setting the controls to improve "clinical quality"; that is, the extent to which the controls of the machine are adjusted so as to give an optimal picture, without considering whether or not the transducer is correctly positioned and whether or not the individual patient is suitable for echocardiography.

FEATURES OF THE PRESENT INVENTION

The present invention is concerned with reducing or eliminating, if possible, the manual efforts of the technician with regard to adjustment of controls on the echocardiogram machine. In accordance with the present invention, the echocardiogram machine is monitored and signals are generated which enable automatic correction by a modification of the control means quicker and more effectively than can be made manually by an operator.

More specifically, the present invention concerns automatic display adjustment means for an echocardiogram machine having a display device and at least one control means controlling brightness of the display regionally and globally, and control means for controlling global image contrast. Means is provided for sensing a selected aspect of relative brightness of pixels within a selected area corresponding to an area of the display controlled by the at least one control means. The means for sensing, in turn, generates an output representative of the selected aspect of brightness therein. Computer means receives brightness sensing signals; a computer program means is provided for comparing them to predetermined standards. Based upon such comparison, the computer produces correction signals. Means is provided enabling the correction signals from the computer means to be applied to the control means. The control means coupled to the echocardiogram machine are responsive to such correction signals to increase or decrease the control effect within the selected area.

In most systems, each of a plurality of CRT areas have their own individual brightness control. Each requires control in the same way. Means is provided for sequencing the correction signals for each of the respective areas such that they are applied to the proper control means corresponding to the control signals generated for the respective areas of the display. Preferably the system also includes an overall brightness control as well, enabling the brightness in all of the areas to be simultaneously changed by corresponding amounts. The automatic display adjustment means also preferably provides a contrast or compress control which adjusts both top and bottom levels of brightness For a better understanding of the present invention, references is made to the accompanying drawings in which:

Figure 2:
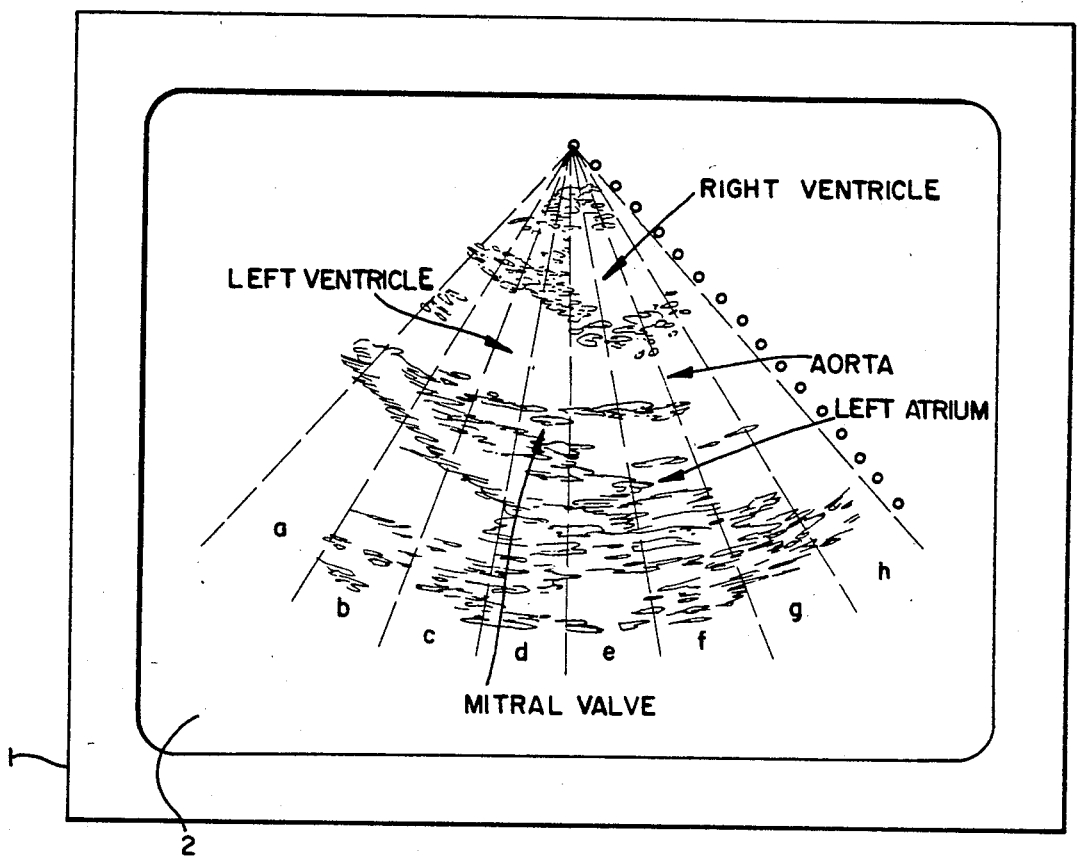
FIG. 2 represents an enlarged view of the screen of the machine of FIG. 1 whereon is shown a representative display for one transducer orientation.
Figure 1:
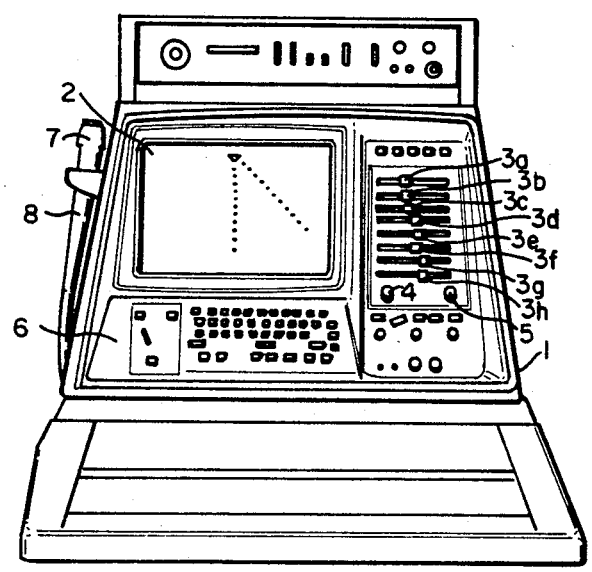
FIG. 1 illustrates a conventional echocardiogram machine as viewed from the front by an operator observer.

The machine illustrated in FIG. 1 is, by way of example, a Hewlett Packard 77020A. The machine illustrated in FIG. 1 has a body or housing containing the electronics and the conventional system necessary for generating a two dimensional cardiogram picture on a cathode ray tube (CRT) 2. The display as shown in FIG. 2 generates a two dimensional picture which represents a 60 degree sweep of the reflected ultrasonic beam pencil. The arcuate sweep picture is, in turn, defined by a plurality of adjacent angular segments "a" through "h" of the image corresponding to adjacent areas of the heart section shown, the brightness of each of which segment is controlled by its own gain control lever 3a through 3h. Adjustment of each of the gain control levers affects its own individual angular segment of the image having a corresponding letter designation in FIG. 2. There is also a transmit intensity control 4, which effects the brightest of the entire image, and a compress control 5, which functions in a manner similar to the contrast control on a television set, to effectively compress or expand the upper and lower limits of brightness in the total picture. A keyboard input 6 and other manual controls may also be included.

The housing 1 also includes the ultrasonic generator and ultrasonic detection and translation circuitry to generate the signals based upon ultrasonic reflections producing the CRT image. A transmit/receive transducer head 7 receives ultrasonic vibrations through coupling cable 8 to the equipment within housing 1. Cable 8 both carries the ultrasonic signal to the transducer 7, causing the effective sweep thereof, and also carries signals from the ultrasonic detector also in head 7 which detects the direction and intensity of reflections. This system, in short, is a small sonar systems intended to generate ultrasound emissions and receive ultrasound reflection signals following a predetermined pattern.

The use of the echocardiogram machine with a patient is conventional in that the patient is required to remove clothing from the waist up and lie on his side on a bed. After application of a sound conducting jelly to the patient's skin in the area of transducer contact, the technician positions the sound transducer against the patient's chest. The transducer itself roughly resembles an elongated electric razor. The orientation of the transducer requires considerable skill not only to make sure that it is positioned to project its ultrasound beam through the heart but in order to select a particular cross-section of the heart to be examined. Other cross-sections of the heart can be examined by repositioning the transducer. When the transducer is roughly in place, a two-dimensional pie-shaped cross-section of the heart begins to appear on the CRT 2 of the electrocardiogram machine 1. Thus, it will be understood that the positioning of the transducer itself is critical and requires precise control by the technician which is customized for the particular patient and the particular cross-sectional view desired.

In accordance with prior art use of the machine of FIG. 1, after the transducer has been put in selected position, the technician has another set of adjustments to be made to the controls on the echocardiogram machine itself. On the machine of FIG. 1, there are 8 gain controls which effect individual angular segments of the image. These angular segments are labeled a, b, c, d, e, f, g and h in FIG. 2 to correspond to the controls 3a, 3b, 3c, 3d, 3e, 3f, 3g and 3h shown in FIG. 1. Each control is adjusted individually. Adjustment of so many controls while positioning the transducer optimally requires considerable effort and skill on the technician's part, especially since, as the patient breathes and moves slightly, continual readjustment must be made. Each of the wedge-shaped regions must be considered individually and effectively a measurement of the proportion of pixels which have attained maximum brightness is made. This has been done as a matter of visual judgment by the technician, but in accordance with the present invention a specification is set up whereby the proportion of maximum brightness pixels corresponds to a fixed percentage of the predetermined segment area, about one and a half percent of the area being a typical standard. In making intensity adjustments in the various segment areas, the overall intensity control 4 is not touched unless one of the segment intensity gain controls reaches its setting limit without accomplishing adjustment within specifications. If this occurs, the intensity control is adjusted affecting the whole screen so as to bring that particular gain control away from its end stop. Thus, the "brightness" parameter is used regionally to adjust the eight individual gain controls 3a through 3h. To adjust the compress control 5, a global (whole screen) measurement of contrast is used and the compress control is moved up or down until the proportion of the pixels which have attained at least half maximum intensity reaches a predetermined level. That level is a specifically determined amount in accordance with the present invention. That amount is selected to occur when the proportion of pixels which have attained at least half minimum intensity equals that which is specified by the program. In actual tests, the specification of photograph quality appears to be an appropriate and adequate criterion for the echocardiogram.

NATURE OF THE PRESENT INVENTION

Figure 3:
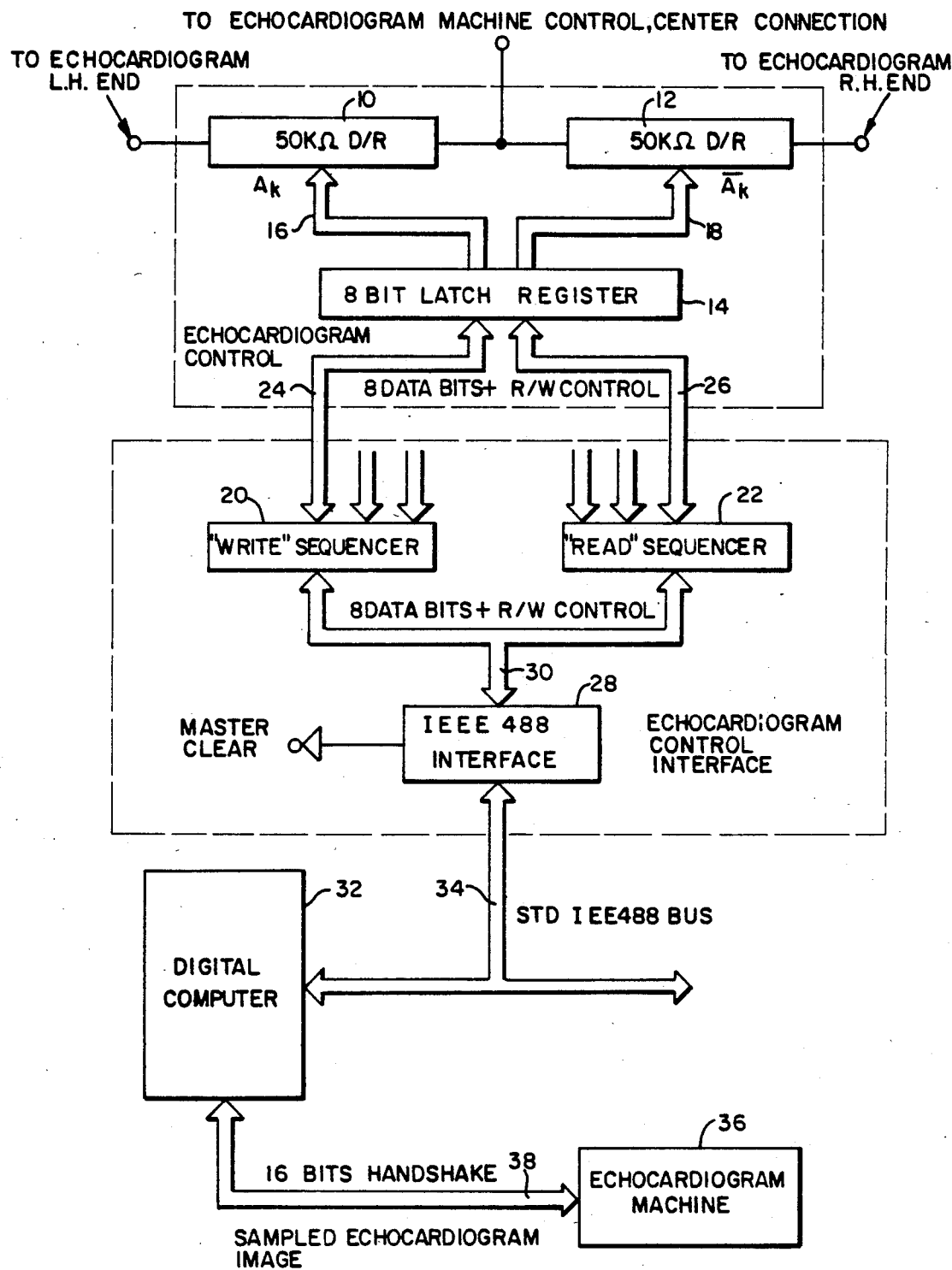
FIG. 3 is a block diagram showing schematically the system of the present invention for controlling an echocardiogram machine of the type shown in FIG. 1, for example.

Referring to FIG. 3, there is shown a schematic diagram of the control system of the present invention which is used with the echocardiogram machine of FIG. 1. In order to make the echocardiogram capable of automatic control, the slide actuated resistance potentiometer connections are removed and resistance ladder type devices are substituted. Changes in resistance are in response to digital count instructions to increase or decrease the effect of resistance of a given control. Connected to the echocardiogram machine at the three potentiometer terminals are three connections as indicated, one to a center connection and one each to a left hand and right hand end connection. The devices connected to the controls are digital to analog converter devices 10 and 12, preferably in the form of chips commercially available. These chips convert eight bits of digital information symbolized by $A_k$ and $\overline{A}_k$. It is understood that each of the existing 50k ohm potentiometers of a Hewlett Packard 77020A echocardiogram machine would have substituted a similar set of similar analog-to-digital converters. The connecting lines consist of eight dataline cables each of which provides point-to-point wire connections to the analog to digital converters 10 and 12 to the respective terminals. The analog to digital converters, in turn, receive information from an eight bit latch register 14 through connections respectively designated 16 and 18. The buffer register holds the last eight bits sent to it from the digital computer for the particular control. Since there are ten controls, there will be effectively a repetition in the system of ten of the dashed boxes indicated as "echocardiogram control", one for each of the gain controls, one for the compressed control and one for the transmit control. The two analog to digital converters 10 and 12 replace existing 50 ohm potentiometers on the machine. Electrical installation simply amounts to unsoldering the three leads from each of the existing ten potentiometers and soldering them to the analog to digital converters in the box marked echocardiogram control.

The dashed box marked "echocardiogram control interface" involves coordinating the computer with the control. Since there are multiple controls to be handled, both from the standpoint of writing or instructing to assume positions and reading or determining the position assumed, this must be done through ten echocardiogram controls, and the sequences of instructing these controls or writing is handled by the write sequencer 20. The sequence of determining what is to be the setting of the controls is determined by the read sequencer 22. The write sequencer selects in sequence the communications lines to each of the eight gain controls and the two system controls described. To effectively change the reading in the register 14, the read sequencer 22 sequentially takes a reading of what is in the register and applied to the analog to digital converters as a setting. This is done through lines 26. A suitable interface 28 is provided to match up with the digital computer and this in conveniently an IEEE 488 interface which, in turn, puts eight data bit read and write control signals on the sequencers 20 and 22. The digital computer 32 is connected to the IEEE 488 interface 28 through a standard IEEE 488 bus 34. The digital computer is also coupled to the echocardiogram machine 36 through a line 38 permitting transfer of 16 bit coding and which gives information about the sample echocardiogram image.

The IEEE 488 interface is a standard interface constructed of several chips which have been constructed for many purposes and is well known in the art. The standard IEEE 488 interface lines or bus supplies the control information to the computer and transmits setting instructions to the controls.

The information on which the control settings are based comes from the echocardiogram image itself. In the analysis of the image, the individual sectors corresponding to the respective gain controls are examined for "brightness". Some definition must be made and the definition of adequacy of a particular image requires at least one pixel in the sector to be of maximum brightness or adjustment is required. On the other end, limit to the number of pixels to obtain maximum brightness is set. A typical specification for this level would be one and a half percent of the area involved. The eight regions of the picture which are controlled by the eight individual gain controls are examined one at a time. The measurement which is made is a proportion of pixels which have attained maximum brightness. In order for the examined segment to be in a satisfactory range, there must be at least a single pixel and not more than one and a half percent of the total pixels in that region of maximum brightness. If that is the case, the overall intensity control 5 is not touched. However, if one of the gain controls reaches its limit setting, the transmit control is adjusted so as to bring the particular gain control away from its limiting condition. Thus, it is the "brightness" parameter which is used regionally to adjust the eight individual gain controls.

To adjust the compress control, a global measurement of contrast is used. In this case, a half maximum intensity level may be used as the standard and, for example, in the global measurement, the compress control is not moved up or down until the proportion of pixels which have attained at least half maximum intensity reaches the selected figure. The compress control then is moved up and down until the proportion of pixels which have attained at least half maximum intensity equals that which is specified as the standard.

In order to accomplish all of this and the adjustment involved, a computer program is required. A copy of such a program is attached hereto as an appendix A. It represents a very simple algorithm for servo controls known as the "bang-bang" servo which is substituted for each of the lever controls. With this method, the direction of motion of the individual control is determined but not the extent to which they must be moved in that direction. Of course a more sophisticated control could be readily applied within the concept of the invention and, for example, involve both direction and amount of motion for the individual controls.

It will be understood that when adjustments have been fully made, the echocardiogram picture will be somewhat as depicted in FIG. 2, although the picture is a simulation rather than an actual duplication of a CRT screen. The various areas which represent designated portions of the heart in cross-section have been indicated, and it will be appreciated that the cardiologist or skilled technician familiar with such pictures will readily be able to read them and more readily be able to ascertain from those produced by the method or system of the present invention the kind of information which is sought from such pictures. It will be appreciated that reorientation of the transducer will enable other sections of the heart to be taken and no effort has been made to suggest the various useful cross-sectional picture which can be developed using an echocardiogram.

The advantage of the present invention is primarily one of time and efficiency. The technician can devote himself to the proper positioning of the transducer. If the system is automatic, adjustment will be quicker and probably overall more accurate and a considerable amount of time can be saved. It is possible to still have advantage by not using the machine fully automatically. For example, the device of the present invention has been used by printing out on the screen approximately three times a second what the control settings should be. This issuance of 27 instructions per second to the technician is obviously much faster than the technician will be able to follow. However, there are some advantages to this intermediate type of use of the invention. By and large, however, the invention will be most satisfactory when adjustment is made completely automatically. It is contemplated that automatic setting of the controls on the echocardiogram machine can be made at the rate of four to six times per second as opposed to the present manual setting time of several minutes. Clearly, the increase of overall patient throughput will be appreciable and probably be increased by at least a factor of two. Additionally, there should be an achievement of much greater uniformity in the quality of the echocardiograms produced. Also, the echocardiograms should be more suitable for computer analysis than those presently produced by manual methods.

A single embodiment of the present invention has been described, although variations in that embodiment have been suggested. It will be understood by those skilled in the art that other types of echocardiogram machines can be used besides the Hewlett Packard machine described. It will furthermore be understood that other types of controls can be employed, the types described herein being merely by way of example and not by way of limitation. Many changes within the scope of the claims are contemplated and all such changes are intended to be within the scope and spirit of the present invention.

Appendix A

```
0001    FTN4
0002    $EMA (SAMPL)
0003          PROGRAM GRABF(5)
0004    *
0005    ***********************************************
0006    *
0007    * Copyright 1984, The Kemp Carraway Heart Institute
0008    *
0009    * 11 Oct 1983 - W. Siler
0010    *
0011    *     Calculates control settings for echocardiogram machine
0012    *     Modified from function &GRABF by M. Mceachern
0013    *
0014    *
0015    * REVISIONS:
0016    * 12OCT83 W. SILER - CHANGED ORDER OF LOOPS FOR MORE LINES IF GAIN=1
0017    * 1DEC83  W. SILER - CHANGED BRIGHTNESS PARAM TO PROJECTED INTERCEPT
0018    *                   OF HIGH END OF HISTOGRAM WITH PIXEL AXIS
0019    *
0020    ***********************************************
0021    *
0022          EXTERNAL CHANE,READP,SRET
0023          DIMENSION INAM(3),IDCB(144),IPRAM(9)
0024          INTEGER USX
0025          INTEGER*4 IDBL,INDEX,BUFLEN,WPF,WDCNT
0026          DIMENSION LINBUF(32),IARC(2),IRAD(2)
0027          INTEGER MASK,COUNT(8,64),STARTP(8),ENDP(8)
0028          REAL FCOUNT(8,64)
0029          INTEGER FRAMES,WIDTH,TMSEC,NL,NP,SL,SP,DPTH
0030          INTEGER FRAME,LINE,ARC,FINCR,LINCR,AINCR,GAIN
0031          INTEGER PIXEL,PIXELS
0032          INTEGER ARC1,ARC2,GAIN1
0033          INTEGER*4 WPF,TVALUE,FSTART,LSTART,POINT
0034          INTEGER STARTP,ENDP,ARCS,STARTL,ENDL,VALUE
0035          INTEGER SF,IGC,INTRVL,GCOUNT,OK,ANS,IGATE,DEBUG
0036          INTEGER CNTR(8),COMAND,SETNGS(9)
0037          REAL HISTO(64),TOTPIX,SETPNT,SETCMP, EXTPIX(8), MOVE(9)
0038          COMMON /USCOM/ USX,IDBL
0039          COMMON /PARAM/ FRAMES,WIDTH,TMSEC,NL,NP,SL,SP,DPTH
0040    *
0041    * IMAGE DATA BUFFER ASSIGNMENT STATMENT
0042    *
0043          INCLUDE [IDBAS
0044    *
0045    *
0046    * Set for sector data
0047    * set for 5 bit data
0048    *
0049          TMSEC = 1HS
0050          WIDTH = 5
0051          IPACK = 16/WIDTH
0052    *
0053    * Get depth of scan
0054    *
0055    10    WRITE(1,'(/"Enter depth of scan _")')
0056          READ(1,'(I2)')DPTH
0057          IF (DPTH.EQ.8) GOTO 20
0058          IF (DPTH.EQ.12) GOTO 20
0059          IF (DPTH.EQ.16) GOTO 20
0060          IF (DPTH.EQ.24) GOTO 20
0061          GOTO 10
0062    *
```

```
0063   *  Default parameters are the center of the frame (lines -120 to
0064   *  121 points 1 to 396) OR (lines -80 to 80 for depth 24)
0065   *
0066       20      IF (DPTH .EQ. 24) THEN
0067                   SL = -80
0068                   NL = 81
0069                   SP = 0
0070                   NP = 396
0071               ELSE
0072                   SL = -118
0073                   NL = 118
0074                   SP = 0
0075                   NP = 396
0076               ENDIF
0077   *
0078   *  Let user change image defaults if desired
0079   *
0080       50      WRITE(1,'(" Use default image parameters (Y/N)?_")')
0081               READ(1,'(A1)') ANS
0082               IF ((ANS .NE. 1HN).AND.(ANS .NE. 1Hn)) GOTO 180
0083       110   WRITE (1,'(/"Specify parameters as follows:")')
0084   *
0085   *  Sector sample default parameters are the full sector with 5 bit data
0086   *
0087               WRITE (1,'("Starting line, # of lines, Starting point,",
0088       x           " # of points, 5 or 8 bit data")')
0089               WRITE (1,'("-118,118,0,396,5",
0090       x           "_")')
0091               IPRAM(1) = -118
0092               IPRAM(2) = 118
0093               IPRAM(3) = 0
0094               IPRAM(4) = 396
0095               IPRAM(5) = 5
0096               CALL READP(IPRAM,5)
0097               SL = IPRAM(1)
0098               NL = IPRAM(2)
0099               SP = IPRAM(3)
0100               NP = IPRAM(4)
0101               WIDTH = IPRAM(5)
0102   *
0103   *  Error checking and user messages for invalid parameters
0104   *
0105               IF ( (WIDTH .EQ. 5) .OR. (WIDTH .EQ. 8) ) GOTO 120
0106       115   WRITE (1,'("INVALID WIDTH")')
0107               GOTO 110
0108       120   IF ( (ABS(SL) .LE. 120) .AND. (SL/2 .EQ. SL/2.0) ) GOTO 130
0109               WRITE (1,'("INVALID STARTING LINE")')
0110               GOTO 110
0111       130   IF ( (NL .GT. 0) .AND. (SL+(NL-1)*2 .LE. 120)
0112       x           .AND. (NL .LE. 118) ) GOTO 140
0113       135   WRITE (1,'("INVALID NUMBER OF LINES")')
0114               GOTO 110
0115       140   IF ( (SP .GE. 0) .AND. (SP .LE. 395) ) GOTO 150
0116       145   WRITE (1,'("INVALID STARTING POINT")')
0117               GOTO 110
0118       150   IF ( (NP .GT. 0) .AND. (SP+NP .LE. 396) .AND.
0119       x           (NP/(16/WIDTH) .EQ. NP*1.0/(16/WIDTH))) GOTO 160
0120       155   WRITE (1,'("INVALID NUMBER OF POINTS")')
0121               GOTO 110
0122       160   WRITE (1,165)
0123   *
0124   *  User message echoing chosen parameters
0125   *
0126       165   FORMAT (/"The parameters for sampling are:")
0127               WRITE (1,'(5X,"",I3," lines of ",I1,
0128       x           " bit Sector data",
0129       x           " starting at line ",I4,"")') NL,WIDTH,SL
0130               WRITE (1,'(5X,"with ",I3," points per line"
0131       x           " starting at point ",I3,"")') NP,SP
0132               GOTO 170
0133   *
0134   *
```

```
0135   *  Allow user the option to respecify parameters
0136   *
0137   170    WRITE (1,'(/"OK (NO to respecify)? Y_")')
0138          READ (1,'(A1)') I
0139          IF (I .EQ. 1HN) GOTO 110
0140   *
0141   *  Set number of frame to 1
0142   180    FRAMES =1
0143   *
0144   ***************************************************************
0145   *
0146   * SET GAIN CONTROL DEFAULTS: SETTINGS ARE THEORETICAL AND CANNOT BE
0147   * ALL REALIZED IN PRACTICE BUT ARE CONVENIENT FOR PROGRAMMING
0148   * ALL INDICES (FRAMES, LINES, ARCS) START AT 1 ON UP (NOT 0).
0149   * VALUES GIVEN ARE INCREMENTED BY 58 = 18*3 FROM GAIN TO GAIN.
0150   * DECREMENT AND INCREMENT THESE VALUES BY 28 TO GET START AND
0151   * END VALUES FOR ARCS USED IN TESTING GAIN CONTROLS.
0152   * DO LOOP STEPS FINC, LINC AND AINC WILL BE INPUT MANUALLY.
0153   *
0154          CNTR(1) = 0
0155          CNTR(2) = 57
0156          CNTR(3) = 114
0157          CNTR(4) = 171
0158          CNTR(5) = 228
0159          CNTR(6) = 285
0160          CNTR(7) = 342
0161          CNTR(8) = 399
0162   *
0163   * Set ranges included in gain control scan
0164   *
0165   * Only do one frame at a time
0166          FINCR = 1
0167          WRITE(1,'("Enter line increment (Default 6) _")')
0168          READ(1,'(I3)') LINCR
0169          IF ( LINCR .EQ. 0 ) LINCR = 6
0170          WRITE(1,'("Enter arc increment (Default 3) _")')
0171          READ(1,'(I2)') AINCR
0172          IF ( AINCR .EQ. 0 ) AINCR = 3
0173   * Get desired control-setting parameters
0174          WRITE(1,'("Desired max pixel value (Default 35) ?")')
0175          READ(1,*)SETPNT
0176          IF (SETPNT .EQ. 0.) SETPNT = 35
0177          WRITE(1,'("Desired percent high pixels (Default = 25) ?")')
0178          READ(1,*)SETCMP
0179          IF (SETCMP .EQ. 0.) SETCMP = 25.
0180   * AINCR must be multiple of three to ease pixel unpacking
0181          AINCR = ((AINCR + 2) / 3) * 3
0182          WRITE(1,'("Enter HI-LO pixel boundary (Default .5) _")')
0183          READ(1,'(I2)') BOUND
0184          IF ( BOUND .EQ. 0 ) BOUND = .5
0185   *
0186   * NOTE: DEPTH,1ST LINE: 8,54: 12,36: 16,27: 24,18 (SKIP FACTOR)
0187   * Use depth to select minimum arc to look at
0188   *
0189          IF ( DPTH .EQ. 8) MINARC = 54
0190          IF ( DPTH .EQ. 12) MINARC = 36
0191          IF ( DPTH .EQ. 16) MINARC = 27
0192          IF ( DPTH .EQ. 24) MINARC = 18
0193   *
0194          MASK = 37B
0195          IF (WIDTH .EQ. 8) MASK = 377B
0196          IPACK = 16/WIDTH
0197          WPF = NL * (NP/IPACK + 1)
0198   *
0199   * Set count array limit
0200   *
0201          IF ( WIDTH .EQ. 5 ) MAXBIN = 32
0202          IF ( WIDTH .EQ. 8 ) MAXBIN = 64
0203   *
0204   * Ask if gating window is desired
0205   *
```

```
0206            WRITE(1,'(" Gating window desired (Y/N)?_")')
0207            READ(1,'(A1)') IGATE
0208   *
0209   *   Set control flag on card to full window
0210   *   Send control parameters to card
0211   *
0212            IOPTN = 0
0213            CALL EXEC(3,2000B.OR.USX,SL)
0214            CALL EXEC(3,2100B.OR.USX,NL)
0215            CALL EXEC(3,2200B.OR.USX,SP)
0216            CALL EXEC(3,2300B.OR.USX,NP)
0217            CALL EXEC(3,2500B.OR.USX,IOPTN)
0218            CALL EXEC(3,2600B.OR.USX,0)
0219            CALL EXEC(3,2700B.OR.USX,WIDTH)
0220   *
0221   * Gating window off
0222            CALL EXEC(3,3100B.OR.USX)
0223   * Turn on gating window if requested
0224            IF(IGATE .EQ. 1HY .OR. IGATE .EQ. 1Hy) THEN
0225               CALL EXEC(3,3000B.OR.USX)
0226            ENDIF
0227   *
0228            WRITE(1,'("Suppress control instruction printout (N) ?")')
0229            READ(1,'(A1)') ISUPR
0230            WRITE(1,'("Debug printout (N) ?")')
0231            READ(1,'(A1)') DEBUG
0232            WRITE (1,'(/"Enter number of settings to calculate and then")')
0233   190      WRITE (1,'("Strike RETURN to start sampling_")')
0234            CALL READP(ISAMP,1)
0235   *
0236   *   Initiate input.  Bit 15 set in the optional sixth parameter
0237   *   indicates TM (set) or sector data being collected
0238   *
0239   200      CALL EXEC(1,USX,IDB,FRAMES,0,0)
0240            ISAMP = ISAMP - 1
0241   ************************************************************************
0242   * Start Calculation loop
0243   *
0244   * Zero out count array
0245   *
0246   210      DO 220 I = 1, 8
0247            DO 220 J = 1, MAXBIN
0248               COUNT(I,J) = 0
0249   220      CONTINUE
0250   *
0251   * Enter counting loop
0252   *
0253   * Note: FSTART = 0
0254   *
0255   * Calculate multiplier for line contribution to point subscript
0256            LMULT = NP/IPACK + 1
0257   *
0258   * Loop over gain controls: get limits for ARC loop
0259   *
0260            IF (DPTH .LT. 16) THEN
0261               GAIN1 = 2
0262            ELSE
0263               GAIN1 = 1
0264            ENDIF
0265   *
0266            DO 402 GAIN = GAIN1, 8
0267   *
0268            ARC1 = CNTR(GAIN) - 15
0269            IF (ARC1 .LT. MINARC) ARC1 = MINARC
0270            ARC2 = CNTR(GAIN) + 15
0271            IF (GAIN .EQ. 1) ARC2 = CNTR(GAIN) + 31
0272            IF (ARC2 .LT. MINARC) GOTO 402
0273            IF (ARC2 .GT. NP) ARC2 = NP
0274   *
0275   * Round arc to multiple of 3
0276   *
```

```
0277            ARC1 = ((ARC1 + IPACK - 1) / IPACK) * IPACK
0278            ARC2 = ((ARC2 + IPACK - 1) / IPACK) * IPACK
0279   *
0280   * Loop over arcs: arcs start at zero
0281   *
0282            IF ( DEBUG .EQ. 1HY ) THEN
0283                WRITE(1,'(" GAIN ",I1," ARC1 ",I3," ARC2 ",I3," AINCR ",I3)')
0284       *            GAIN,ARC1,ARC2,AINCR
0285            ENDIF
0286            DO 401 ARC = ARC1, ARC2, AINCR
0287   *
0288   * Get arc contribution to subscript for point
0289   *
0290                ASTART = ARC/IPACK + 1
0291   * Loop over lines
0292                LINE1 = 1
0293                LINE2 = NL
0294                IF (GAIN .EQ. 1 .AND. DEPTH .LT. 24) THEN
0295                    TLINCR = (LINCR + 3) / 4
0296                ELSE
0297                    TLINCR = LINCR
0298                ENDIF
0299                IF ( DEBUG .EQ. 1HY ) THEN
0300                    WRITE(1,'(" ARC ",I3," LINE1 ",I3," LINE2 ",I3," TLINCR ",I3)')
0301       *                ARC,LINE1,LINE2,TLINCR
0302                ENDIF
0303                DO 400 LINE = LINE1, LINE2, TLINCR
0304   * Calculate point subscript
0305                    LSTART = LMULT * (LINE - 1)
0306                    POINT = LSTART + ASTART
0307                    PIXELS = IDB(POINT)
0308   *
0309   * Now in counting region, increment proper histogram bin
0310   *
0311                    PIXEL = ISHFT(PIXELS,-1)
0312                    IVAL =(PIXEL.AND.MASK) + 1
0313                    COUNT(GAIN,IVAL) = COUNT(GAIN,IVAL) + 1
0314   400          CONTINUE
0315   401      CONTINUE
0316   402      CONTINUE
0317            IF (DEBUG .EQ. 1HY .OR. DEBUG .EQ. 1Hy) WRITE(1,'(" Out of 402")')
0318   *
0319   * Calculate floating point cumulative histograms
0320   *
0321   * If GAIN1 > 1 zero unused FCOUNT, HISTO
0322   *
0323            IF ( GAIN1 .EQ. 1 ) GOTO 408
0324            DO 406 GAIN = 1, GAIN1 - 1
0325                DO 404 IBIN = 1, MAXBIN
0326                    FCOUNT(GAIN,IBIN) = 0.
0327   404          CONTINUE
0328   406      CONTINUE
0329   408      DO 420 GAIN = GAIN1, 8
0330                FCOUNT(GAIN,MAXBIN) = COUNT(GAIN,MAXBIN)
0331                DO 410 I = MAXBIN-1, 1, -1
0332                    FCOUNT(GAIN, I) = FCOUNT(GAIN, I+1) + COUNT(GAIN, I)
0333   410          CONTINUE
0334   420      CONTINUE
0335   *
0336            IF(DEBUG.EQ.1HY.OR.DEBUG.EQ.1Hy) THEN
0337                WRITE(1,'(" Cumulative histogram finished")')
0338            ENDIF
0339   * Get HISTO for entire image
0340   *
0341            DO 430 I = MAXBIN, 1, -1
0342                HISTO(I) = 0 .
0343                DO 425 GAIN = GAIN1, 8
0344                    HISTO(I) = HISTO(I) + FCOUNT(GAIN, I)
0345   425          CONTINUE
0346   430      CONTINUE
```

```
0347            TOTAL = HISTO(1)
0348    *
0349    * Normalize histograms to 100 percent
0350    *
0351            DO 440 I = MAXBIN, 1, -1
0352               DO 435 GAIN = GAIN1, 8
0353                  IF ( FCOUNT(GAIN,1) .NE. 0. )
0354        *            FCOUNT(GAIN, I) = 100. * FCOUNT(GAIN,I) / FCOUNT(GAIN,1)
0355    435        CONTINUE
0356               IF ( HISTO(1) .NE. 0. )
0357        *         HISTO(I) = HISTO(I) / HISTO(1) * 100
0358    440     CONTINUE
0359    *
0360    *
0361    * Ready to compute control settings
0362    *
0363            IF (GAIN1 .GT. 1) SETNGS(1) = 2H 0
0364    *
0365    * Set BIGMAX = largest extrapolated pixel maximum
0366            BIGMAX = 0
0367    470     DO 2230 GAIN = GAIN1, 8
0368    *
0369    * Get extrapolated (if necessary) max pixel gray scale value
0370    * First get unextrapolated max gray scale
0371    *
0372               DO 2222 MAXPIX = MAXBIN , 1, -1
0373                  IF (FCOUNT(GAIN,MAXPIX) .GT. 0.) GO TO 2223
0374    2222       CONTINUE
0375    *
0376    * No pixels found above bin 1, reset maxpix to 1
0377    *
0378               MAXPIX = 1
0379    2223       CONTINUE
0380    * Get extrapolated intercept if there are some non-zero pixels
0381            IF (MAXPIX .GT. 1) THEN
0382               IF ((FCOUNT(GAIN, MAXPIX-1)-FCOUNT(GAIN,MAXPIX)) .GT. 0) THEN
0383                  EXTPIX(GAIN) = FCOUNT(GAIN, MAXPIX) * 2 /
0384        *            (FCOUNT(GAIN,MAXPIX-1)-FCOUNT(GAIN,MAXPIX))+MAXPIX-1
0385               ELSE
0386                  EXTPIX(GAIN) = MAXPIX - 1
0387               ENDIF
0388            ENDIF
0389            IF (MAXPIX .EQ. 1) THEN
0390               EXTPIX(GAIN) = 0
0391            ENDIF
0392    *
0393    * Check BIGMAX value
0394            IF ( BIGMAX .LT. EXTPIX(GAIN) ) BIGMAX = EXTPIX(GAIN)
0395    * Get gain control motion parameter
0396    *
0397            MOVE(GAIN) = (SETPNT - EXTPIX(GAIN))/4.
0398    * Store bang-bang control settings
0399            IF ( MOVE(GAIN) .GT. 0 ) THEN
0400               SETNGS(GAIN) = 2HUP
0401            ELSE
0402               SETNGS(GAIN) = 2HDN
0403            ENDIF
0404    *
0405    2230    CONTINUE
0406    *
0407    * Get compress setting direction
0408            IBOUND = BIGMAX * BOUND + 1
0409            IF (IBOUND .GT. MAXBIN) IBOUND = MAXBIN
0410            MOVE(9) = SETCMP - HISTO(IBOUND)
0411    * Print control setting directions
0412    *
0413            IF ( ISUPR .NE. 1HY .AND. ISUPR .NE. 1Hy ) THEN
0414               WRITE(1,'(" Set ", 9(I1,1X,A2,2X),1X,I2,1X,F5.2,1X,F6.0)')
0415        *         ((I,SETNGS(I)),I=1,9),IBOUND, HISTO(IBOUND),TOTAL
0416               WRITE(1,'(" Val ", 9(1X, F5.1) )') (MOVE(I), I = 1, 9)
0417            ENDIF
0418    *
```

```
0419 * MORE SAMPLES ?
0420 *
0421       IF (ISAMP .GT. 0) GOTO 200
0422 * EXIT TO MAIN
0423       CALL SRET
0424       END
0425       END$
```

I claim:

1. Automatic display adjustment means for an echocardiogram machine having a display device and at least one control for controlling brightness of the display comprising:
   means for sensing a selected aspect of relative brightness of pixels within a defined area of the display device controlled by the control and generating an output representative thereof;
   computer means for receiving brightness sensing signals, comparing them to a predetermined standard and producing a correction signal;
   control means provided at said control and responsive to correction signals to increase or decrease the control effect within the selected area; and
   means enabling the correction signal from the computer means to be applied to the control means.

2. The automatic display adjustment means of claim 1 in which the echocardiogram machine has a display device having separate control means for controlling brightness of the display in different specific regions thereof, the means sensing the brightness successively sensing the brightness in the respective regions of the computer means, comparing each of the limited regions to a standard and providing in sequence correction signals for each of the regions, and sequencing means is provided to sequence each of the correction signals to the proper one of the respective control means.

3. The automatic display adjustment means of claim 2 in which, in addition to the regional adjustment, an overall adjustment and sensing means is provided for sensing the brightness of the overall display which is compared by the computer with a standard and separate control means is provided for adjusting overall brightness up or down to be more in accordance with said predetermined standard.

4. The automatic display adjustment means of claim 2 in which means is provided whereby contrast within the display is sensed and a contrast control is provided having means responsive to a correction signal generated by the computer to correct deviation from predetermined comparison standards for adjustment of the relative limits of darkness and lightness in the picture.

5. A method of adjustment of an echocardio-gram machine having a display device and at least one control for controlling brightness of the display region comprising:
   sensing a selected aspect of relative brightness of pixels within a defined area of the display device controlled by the brightness control;
   using a computer to compare the defined area with a selected standard for the maximum number of bright pixels in the display region and generating a correction signal; and
   adjusting the at least one control in accordance with the correction signal.

6. The method of claim 5 employing the additional steps of examining a plurality of different defined areas of the display device and sequentially comparing those defined areas to the standard to generate a plurality of correction signals and adjusting separate controls for the respective defined areas as needed in accordance with the correction signals.

7. The method of claim 6 in which in addition to examining the different defined areas of the display device, the additional step of examining the brightness of the entire display device, comparing that brightness to the standard to generate an overally brightness correction signal and adjusting the control for overall brightness as needed in accordance with the brightness correction signal.

8. The method of claim 6 employing the additional steps of sensory contrast within the display, comparing the contrast to a standard to generate a contrast correction signal and making adjustment as needed to a contrast control in accordance with the contrast correction signal.

9. The method of claims 6, 7 or 8 employing the error correction signals in a known sequence and sequencing control adjustment in the same sequence.

10. The method of claims 5, 6, 7 or 8 requiring applying any correction signal to means for automatically adjusting its related control.

* * * * *

UNITED STATES PATENT AND TRADEMARK OFFICE
CERTIFICATE OF CORRECTION

PATENT NO. : 4,593,314
DATED : June 3, 1986
INVENTOR(S) : William M. Siler

It is certified that error appears in the above-identified patent and that said Letters Patent is hereby corrected as shown below:

Claim 6, line 6, after "respective" insert --different--.

Signed and Sealed this

Twenty-sixth Day of August 1986

[SEAL]

Attest:

DONALD J. QUIGG

Attesting Officer

Commissioner of Patents and Trademarks